Figure 1:
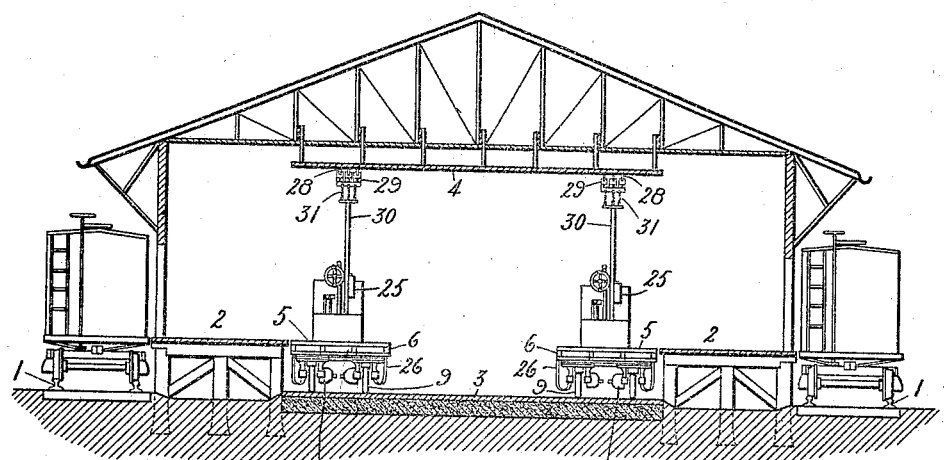

No. 840,423. PATENTED JAN. 1, 1907.
N. C. BASSETT.
BRAKE FOR TRANSFER WAGONS.
APPLICATION FILED DEC. 27, 1905.

5 SHEETS—SHEET 1.

Witnesses:
Benjamin B. Hull
Helen Orford

Inventor:
Norman C. Bassett,
by Albert G. Davis
Att'y.

No. 840,423. PATENTED JAN. 1, 1907.
N. C. BASSETT.
BRAKE FOR TRANSFER WAGONS.
APPLICATION FILED DEC. 27, 1905.

5 SHEETS—SHEET 3.

Witnesses:

Inventor:
Norman C. Bassett,
By Albert H. Davis
Att'y.

No. 840,423.
PATENTED JAN. 1, 1907.
N. C. BASSETT.
BRAKE FOR TRANSFER WAGONS.
APPLICATION FILED DEC. 27, 1905.
5 SHEETS—SHEET 4.
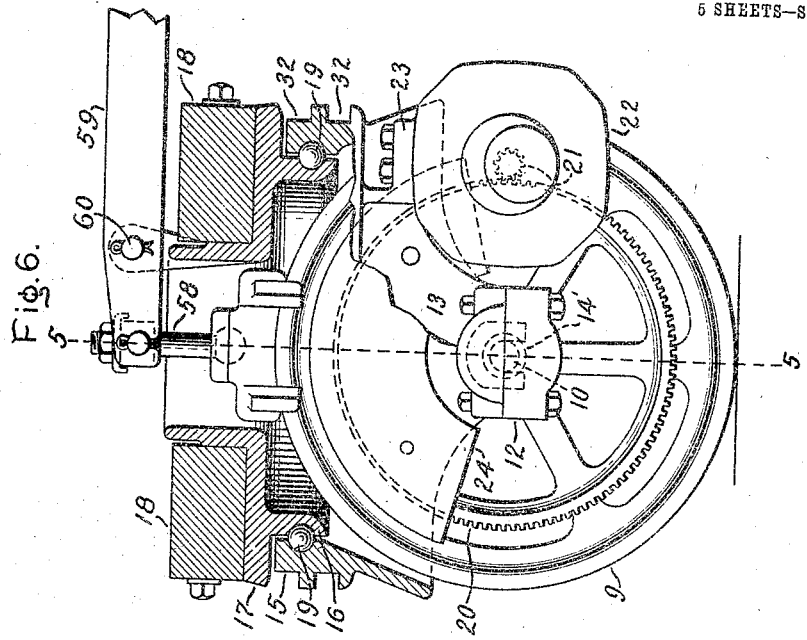
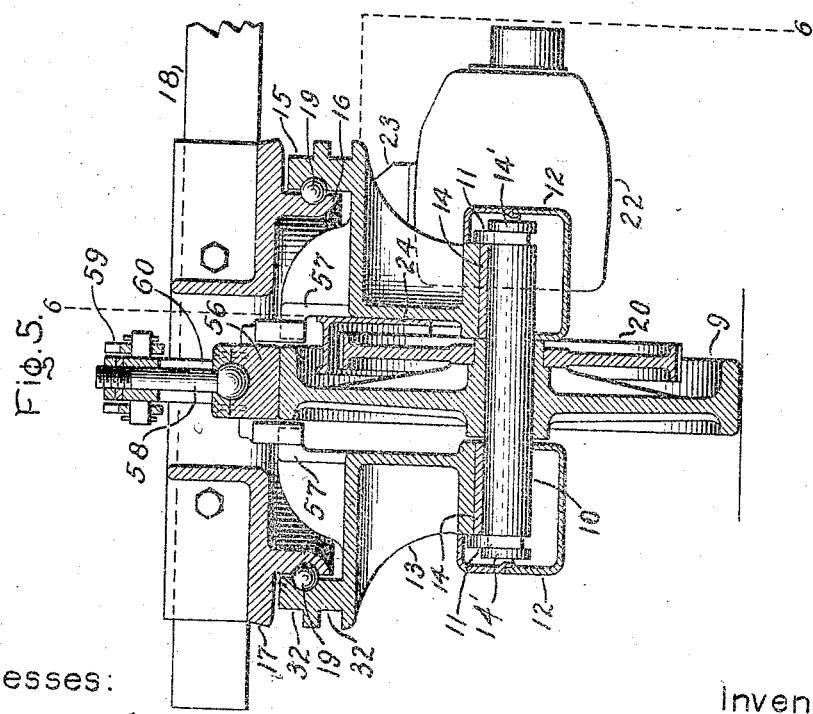
Witnesses:
Benjamin Bourne
Helen Oxford
Inventor:
Norman C. Bassett.
by Albert H. Davis
Att'y.

No. 840,423. PATENTED JAN. 1, 1907.
N. C. BASSETT.
BRAKE FOR TRANSFER WAGONS.
APPLICATION FILED DEC. 27, 1905.
5 SHEETS—SHEET 5.
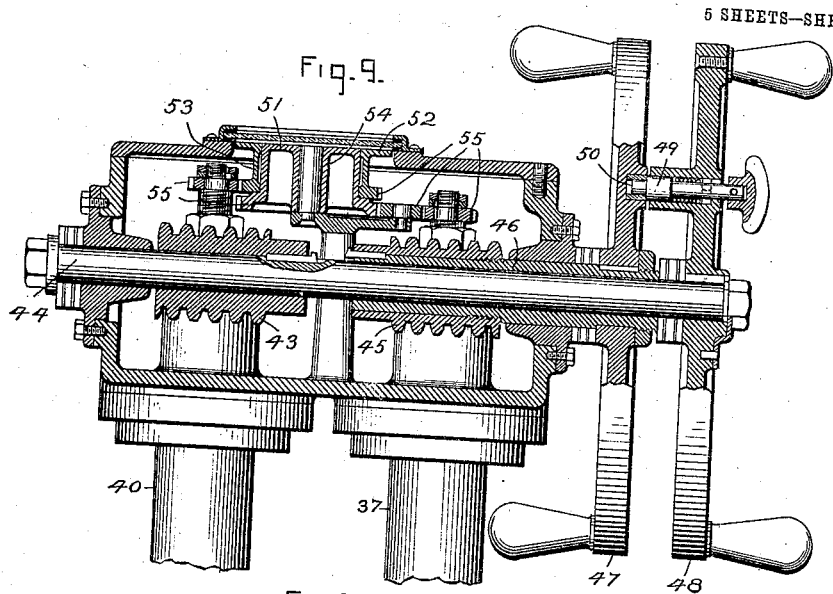
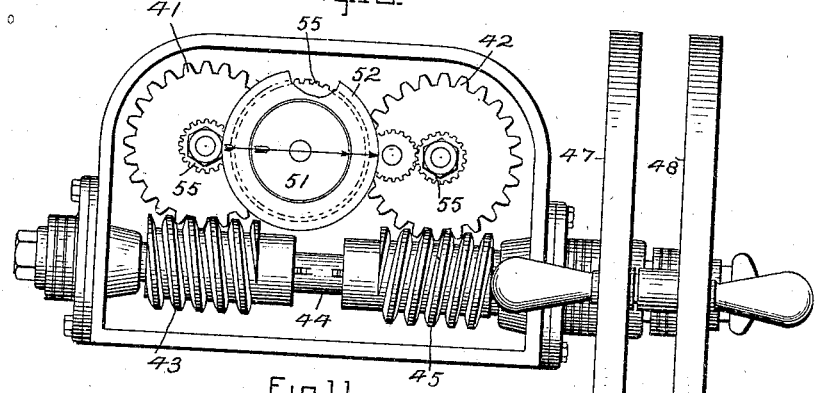
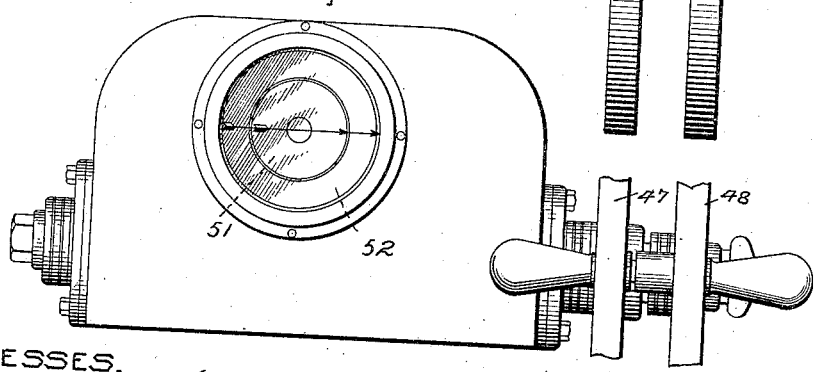
WITNESSES.
INVENTOR.
NORMAN C. BASSETT
by Albert G. Davis
Atty.

UNITED STATES PATENT OFFICE.

NORMAN C. BASSETT, OF MILWAUKEE, WISCONSIN, ASSIGNOR TO GENERAL ELECTRIC COMPANY, A CORPORATION OF NEW YORK.

BRAKE FOR TRANSFER-WAGONS.

No. 840,423. Specification of Letters Patent. Patented Jan. 1, 1907.

Original application filed May 2, 1902, Serial No. 105,590. Divided and this application filed December 27, 1905. Serial No. 293,478.

*To all whom it may concern:*

Be it known that I, NORMAN C. BASSETT, a citizen of the United States, residing at Milwaukee, in the county of Milwaukee and State of Wisconsin, have invented certain new and useful Improvements in Transfer-Wagons, of which the following is a specification.

Modern systems of transportation involve some complicated problems in the matter of redistributing freight at central points, so that all goods coming in on different lines and bound for the same destination shall be quickly and surely loaded in the same car or train and at the least expenditure of time and labor. Where each road has its own terminal station and all freight coming into each and billed through on other roads must be carted away and delivered at the several freight-houses of the other roads, a vast amount of time is consumed and a costly handling and rehandling of the goods is necessary. It is for this reason that in one or more large railroad centers immense freight terminals have been constructed, to which are run all trains of all roads and where the through freight is sorted and reloaded in the proper cars. The goods are moved by hand on the ordinary two-wheeled trucks. It has been proposed to substitute power-driven wagons for the hand-trucks, thus enabling one man to move more goods at one time and more rapidly than is now possible and with a decided saving in the time and labor involved. In carrying out such a system the wagons must be movable in any direction lengthwise or transversely of the freight-house. As the floor is some thirty or forty feet wide between the receiving-platforms and is one or two thousand feet long, it is evident that when the wagons are electrically driven, the ordinary overhead trolley-conductors can not be used. To permit a free movement of the wagons, it is therefore proposed in such cases to use a metal ceiling and a metal floor forming the terminals of the power-circuit, the overhead trolley-wheels on the wagons having flat peripheries, so that they can move easily in any direction along the ceiling. It is desirable that the wagon be capable of turning quickly, and in a short space, of moving sidewise out from a platform to avoid disturbing other wagons in front of or behind it, and to run obliquely across the floor with its body parallel with the platforms when the transfer is to points nearly opposite the point of departure.

My invention relates to a wagon of the class described capable of accomplishing these movements.

To this end it consists of a body or platform mounted on four swiveled truck-wheels, each wheel driven by its own motor. The wagon is also provided with steering devices and brakes. When electric motors are used, they are preferably connected in series and all controlled by a controller at one end of the wagon. Current is taken from the metal ceiling by a multiple trolley having preferably three wheels. The front truck-wheels are connected with one steering-wheel and the rear truck-wheels with another steering-wheel, both wheels being close together, so that they can be easily operated either separately or together. The steering and controlling devices and the trolley-pole are mounted at the front end of the wagon, leaving the greater part of body-platform clear for receiving goods. If all four truck-wheels stand lengthwise of the body, the wagon will run lengthwise. If the wheels are all turned transversely, the wagon will move laterally, either at right angles with its longitudinal axis or obliquely thereto, according to the angle through which the wheels are turned. If the front wheels are turned one way and the rear wheels the other, the wagon will turn in a circle and even in its own length, if necessary. If the front wheels only are turned, leaving the others in line with the body, the wagon will steer like an ordinary wagon or automobile. The same effect can be produced if the rear wheels only are turned when the wagon is running backward.

The brake mechanism is so arranged that the brake for each pair of wheels may be operated independently of the brakes for the other pair of wheels. As a result the brakes may be applied to either pair of wheels without applying them to the other pair, or the brakes may be simultaneously applied to both pairs of wheels to produce equal or different degrees of retardation thereof. This arrangement facilitates the steering of the vehicle. For instance, where both pairs of wheels are turned transversely to the length of the truck the relative speeds of the two pairs of wheels, and thereby the movement, of the vehicle may be varied by the action of the brake mechanism.

In the present application claims are made on the arrangement and construction of the braking mechanism shown and described. Novel features of construction and arrangement shown and described, but not claimed in the present application, are claimed in my present application, Serial No. 105,590, filed May 2, 1902, of which this application is a division.

Figure 2:
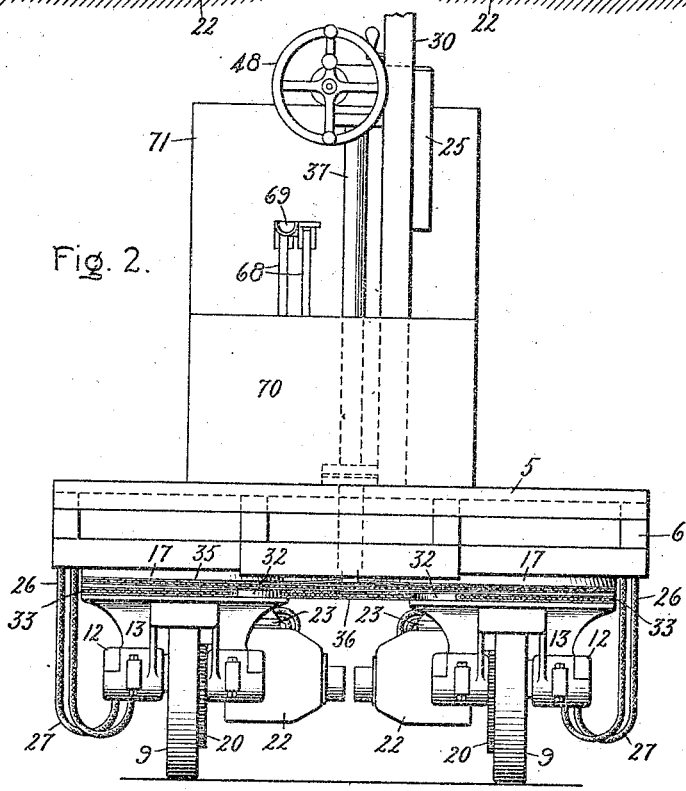
Figure 3:
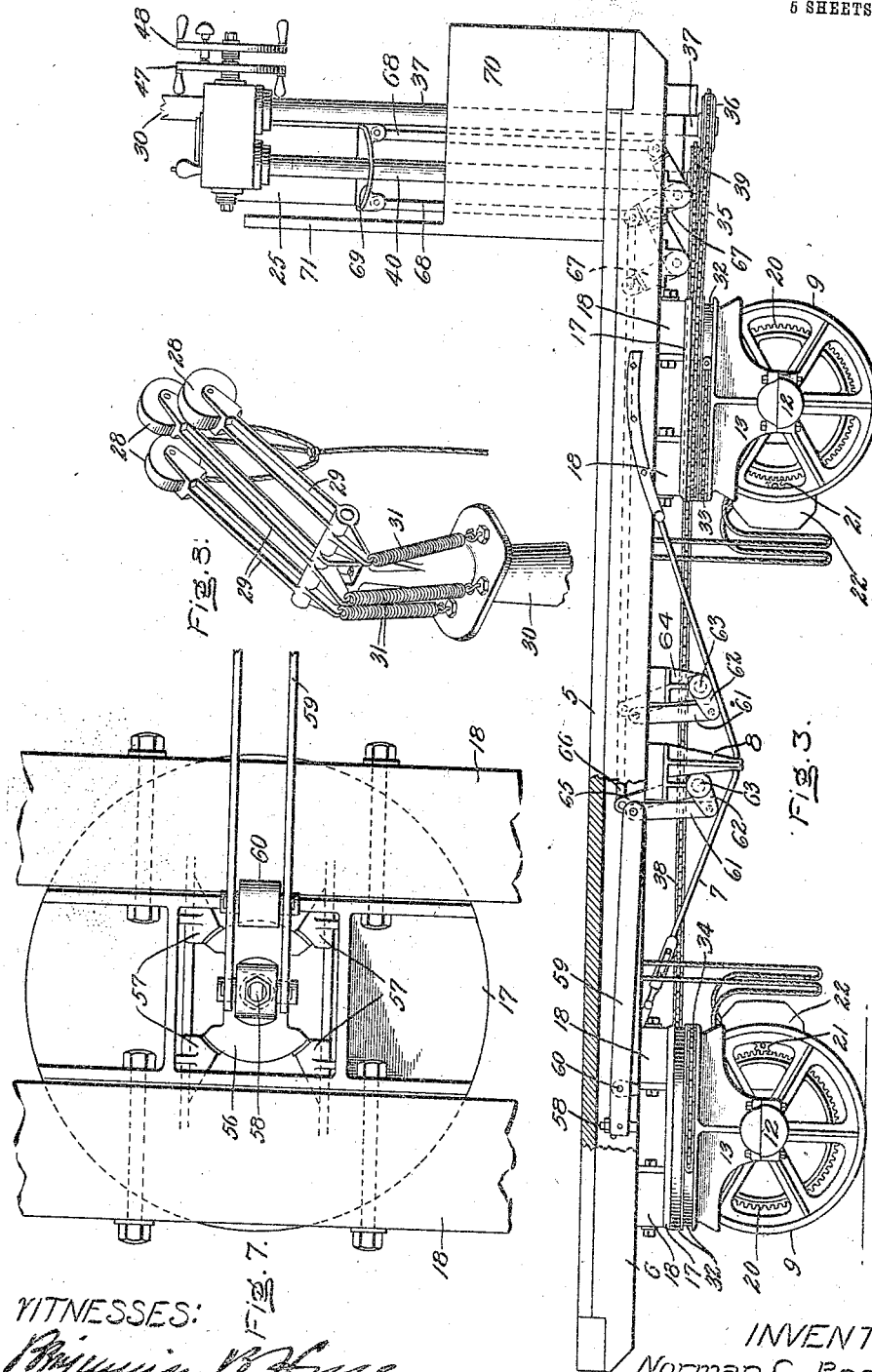
Figure 4:
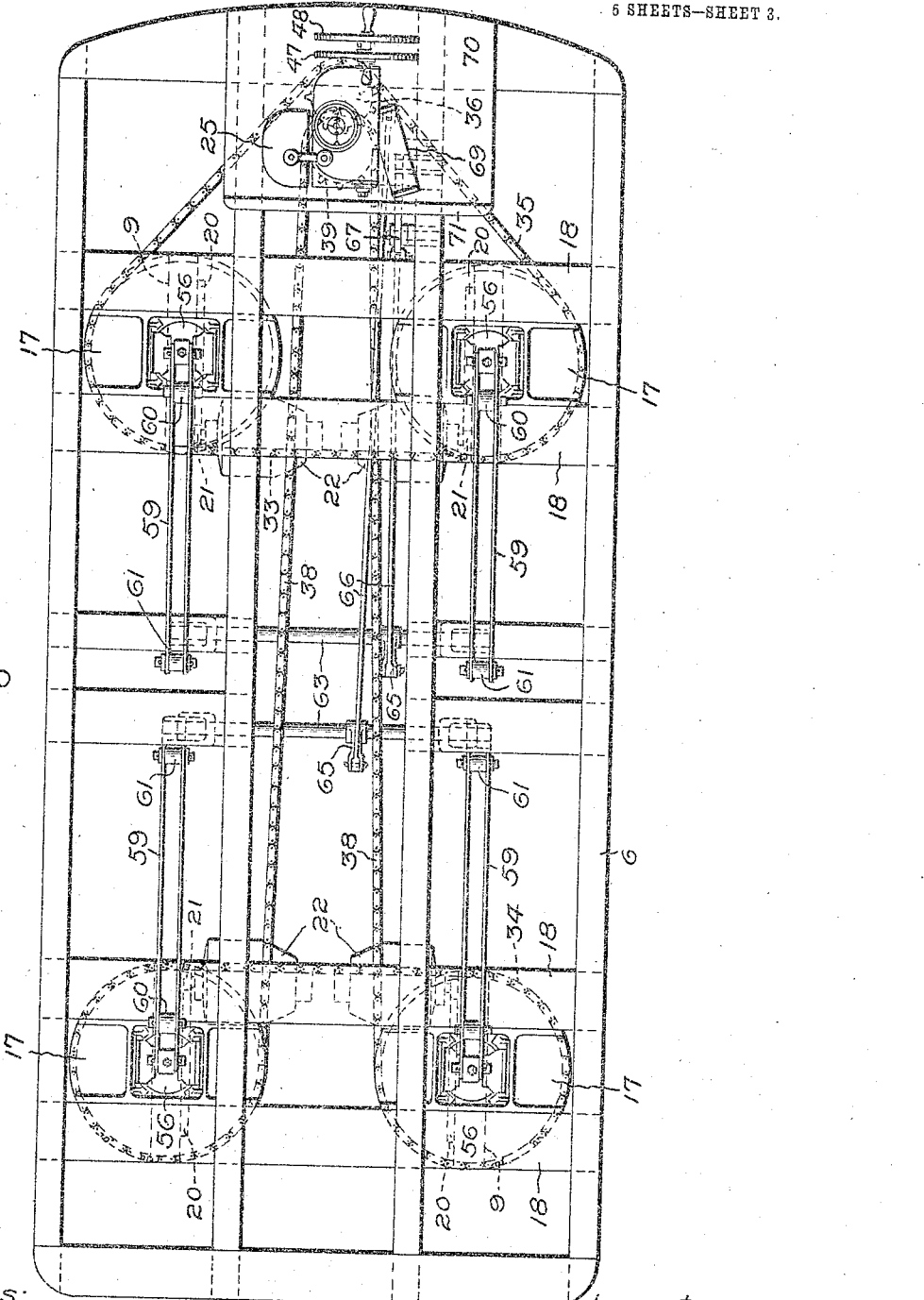

In the accompanying drawings, Figure 1 is a transverse section of a freight terminal equipped with my improved transfer-wagons equipped with electric motors. Fig. 2 is a front elevation of the wagon, on a larger scale. Fig. 3 is a side elevation thereof, partly in section. Fig. 4 is a top plan view with the platform or body-floor removed. Fig. 5 is a sectional elevation of one of the trucks on the line 5 5, Fig. 6. Fig. 6 is a sectional elevation of the truck on the line 6 6, Fig. 5. Fig. 7 is a top plan view of the truck. Fig. 8 is a view of the multiple trolley. Fig. 9 is a sectional elevation of the steering-gear and its indicator. Fig. 10 is a top plan view of the same with the top of the casing removed. Fig. 11 is a top plan view of the casing.

The freight-house is a long narrow structure having a steam-railroad track 1 along each side just outside the walls. Along the inside of the building on each side runs a platform 2 on a level with the car-floors. When electrically-driven wagons are used, the space between the platforms has an iron floor 3 and a copper or other metal ceiling 4. The terminals of the power-circuit are connected, respectively, with said floor and ceiling. The electric transfer-wagons have body-floors or platforms on a level with the station-platforms 2, and are equipped with electric motors, which receive current from the ceiling through trolleys.

The wagon illustrated has a carrying capacity of ten tons. Other wagons are provided of one ton, five tons, and twenty tons capacity, but not differing essentially in construction from the one shown. The body-floor or platform 5 of the wagon is flat and is carried on a frame 6 of suitable construction, stiffened by truss-rods 7 and posts 8. The body is preferably more than twice as long as it is wide, and near each corner is a single-wheeled swiveling-truck. The truck-wheel 9 is secured on an axle 10, provided on each side of the wheel with journals 11, which are received in axle-boxes 12 on the truck-frame 13 and have the usual brasses 14 and thrust-plates 14'. The frame 13 has a circular top concentric with the vertical diameter of the wheel 9 and provided with a cylindrical upright flange 15, fitting around a circular flange 16, depending from a ring-bearing 17, secured to transverse bolster-blocks 18 on the under side of the wagon-frame 6. In the adjacent faces of the two flanges are registering grooves, in which are a plurality of steel balls 19, which serve to unite the truck-frame and ring-bearing and enable the former to swivel easily on the latter.

Secured to the truck-wheel is a gear 20, with which meshes a pinion 21 on the shaft of the motor 22, which is supported by an arm or lug 23 on the truck-frame. To prevent dirt or any other foreign substance from falling into the teeth of the gear 20, a guard-flange 24 is secured into the truck-frame, covering the upper portion of the gear.

When electric motors are used, all four motors are connected in series and with a controller 25 placed on the overhanging front of the wagon-body. This controller is of the usual railway type and need not be described in detail. The leads for the motors are bunched in cables 26, which are led along the under side of the wagon-body and are carried to each motor in a loop 27 with sufficient slack to permit the trucks to be freely turned through one hundred and eighty degrees. The controller is provided with the usual reversing-switch, so that the trucks can be run in either direction. Current is taken from the metal ceiling by means of a trolley composed, preferably, of three flat wheels 28, staggered to insure good contact, journaled in short forked trolley-poles 29, hinged at the upper end of a standard 30, erected on the wagon near the controller. Springs 31 keep the trolley yieldingly pressed against the ceiling.

The steering devices are as follows: Around the outside of the flange 15 on the truck-frame are grooves 32. A chain 33 has its ends secured in one of these grooves in the two forward trucks, and a chain 34 similarly connects the two rear trucks. A chain 35 has its ends secured in the other groove in the forward trucks and passes around a sprocket 36 on a vertical shaft 37 at the front of the wagon near the controller. A chain 38 is similarly secured to the rear trucks and passes around a sprocket 39 on a second vertical shaft 40, slightly in the rear of the shaft 37. On the upper ends of the shafts are worm-gears 41 42. A worm 43 on a horizontal shaft 44 meshes with the rear worm-gear 41. A second worm 45 on a sleeve 46, concentric with the shaft 44, meshes with the worm-gear 42. The front end of the sleeve carries a hand-wheel 47, and the shaft 44 projects beyond it and carries a hand-wheel 48. It will be seen that from the way the chains are attached to the trucks, one of these worms must be right-handed and the other left-handed in order that the hand-wheels may both rotate in the same direction to effect a similar given angular movement of both pairs of trucks. Means are provided for locking the shaft 44 and the sleeve 46 together, such as a spring-dog 49 on the wheel 48, adapted to enter a socket 50 in the hand-wheel 47. By turning the hand-wheel 47 the two front trucks are turned, and similarly the two rear trucks are turned by the hand-wheel 48. When the wheels are locked together, all four trucks will be turned simultaneously and at the same angle. The trucks are so arranged that they can be turned to any angle up to ninety degrees either way from a straight forward position. As the circular flanges 15 are concentric with the vertical diameters of the truck-wheels, the latter will simply swivel on this diameter when the steering-wheels 47 48 are operated.

In order that the motorman may know the exact angular position of each pair of truck-wheels, an indicator is connected with each worm-gear. This may be simply a needle carried on an extension of the sprocket-shaft; but I prefer to arrange two needles on one axis, one being marked on a circular disk 51 and the other on an annulus 52, concentric with the disk. The hub 53, carrying said annulus, is sleeved on the hub 54 of the disk, and each hub is suitably connected, preferably by toothed wheels 55, with its respective sprocket-shaft in such manner that both needles swing in the same direction when the two pairs of trucks are turned in the same direction. It is preferred to have both needles point straight ahead when the wheels stand in the straight forward position and to indicate the same angular positions assumed by the trucks when the hand-wheels are operated. This is readily accomplished by properly proportioning the gears 55, which connect the hubs 53 54 with the sprocket-shafts.

The brakes are each composed of a shoe 56, resting on top of the truck-wheel and vertically movable in guides 57, forming part of the truck-frame. Attached to the middle of the shoe by a ball-and-socket joint and in line with the vertical diameter of the truck-wheel is a hanger 58, hinged at its upper end to a brake-lever 59, which is fulcrumed at 60 on the stationary ring-bearing of the truck. The annular form of said bearing gives space for the brake-shoe and its guides to turn with the wheel and to enable the hanger 58 to pass up to the brake-lever. The long arm of the brake-lever is connected by a link 61 with a rock-arm 62 on a rock-shaft 63, journaled in bearings 64, secured to the under side of the wagon-frame 6. Another rock-arm 65 is connected by a brake-rod 66 with one arm of a bell-crank lever 67 under the wagon-floor near the controller. From the other arm of said bell-crank lever a presser-rod 68 rises to a pedal 69, which is hinged at each end to the two rods 68.

The motorman stands at one side of the controller facing the opposite side of the wagon, so that by turning his head to one side or the other he can look forward or backward along the line of movement of the wagon. He is preferably elevated on a platform 70. A fence 71 protects him and the controller and steering-gear from being interfered with by goods when they are loaded on the wagon. With his right hand he manipulates the steering-wheels and with his left hand the controller, while his left foot rests on the brake-pedal. By pressing down on one end of the pedal the brakes on the forward wheels will be operated, while those on the rear wheels can be set by pressing down on the other end of the pedal. An even pressure on both rods sets all the brakes. The motorman thus has complete control of the machine and can run it in any direction at will—either forward, backward, transversely, obliquely, or in a curved path.

What I claim as new, and desire to secure by Letters Patent of the United States, is—

1. A transfer-wagon, comprising a body, a plurality of independently-swiveled single-wheel trucks, and brake-shoes bearing on the tops of said wheels, each shoe being swiveled to a brake-lever.

2. In a single-wheeled swiveled truck, whose axis of rotation is a vertical diameter of the wheel, the combination with said wheel, of a brake-shoe bearing on top thereof, a brake-lever fulcrumed on the stationary bearing of said truck, and a hanger hinged to the lever and swiveled to the brake-shoe.

3. In a single-wheeled swiveled truck, whose axis of rotation is a vertical diameter of the wheel, the combination, with a truck-frame having guides, of a brake-shoe vertically movable in said guides and bearing on top of the wheel, and a brake-lever having a swiveled connection with said shoe.

4. In a transfer-wagon, comprising a plurality of independently-swiveled single-wheel trucks, the combination, with each truck-wheel, of a brake-shoe therefor, a brake-lever swiveled to said shoe, a rock-shaft for actuating said lever, and a brake-rod and foot-pedal for operating said shaft.

5. In a transfer-wagon, comprising two pairs of independently-swiveled single-wheel trucks, the combination, with each truck-wheel, of a brake-shoe therefor, a brake-lever swiveled to said shoe, a rock-shaft for actuating the levers for each pair of wheels, a brake-rod for each rock-shaft, and a foot-pedal adapted to operate either one or both of said rods at will.

6. In a transfer-wagon, comprising two pairs of independently-swiveled single-wheel trucks, the combination, with each truck-wheel, of a brake-shoe therefor, a brake-lever fulcrumed on the wagon and swiveled to said shoe, a rock-shaft for actuating the levers for each pair of wheels, a brake-rod for each rock-shaft, a bell-crank lever pivoted to each brake-rod, an upright presser-rod pivoted to each bell-crank lever, and a pedal hinged at each end to one of said presser-rods.

In witness whereof I have hereunto set my hand this 18th day of December, 1905.

NORMAN C. BASSETT.

Witnesses:
FRED S. SUTER,
H. C. CASE.